(12) United States Patent
Chakraborty

(10) Patent No.: US 7,689,866 B2
(45) Date of Patent: Mar. 30, 2010

(54) METHOD AND APPARATUS FOR INJECTING TRANSIENT HARDWARE FAULTS FOR SOFTWARE TESTING

(75) Inventor: Tapan Jyoti Chakraborty, West Windsor, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 602 days.

(21) Appl. No.: 11/550,498

(22) Filed: Oct. 18, 2006

(65) Prior Publication Data

US 2008/0155328 A1    Jun. 26, 2008

(51) Int. Cl.
*G06F 11/00* (2006.01)
(52) U.S. Cl. ......................................................... 714/32
(58) Field of Classification Search ..................... 714/41
See application file for complete search history.

(56) References Cited

U.S. PATENT DOCUMENTS

| 5,617,429 | A  | * | 4/1997 | Goto ........................... 714/736 |
| 7,284,159 | B2 | * | 10/2007 | Chakraborty et al. ......... 714/41 |
| 2005/0050393 | A1 | * | 3/2005 | Chakraborty et al. ......... 714/30 |

FOREIGN PATENT DOCUMENTS

EP         0 415 614 A    3/1991
EP         0 511 752 A    11/1992

OTHER PUBLICATIONS

International Search Report & Written Opinion, corresponding PCT/US2007,021124, Dated Aug. 27, 2008, 14 pages.
Beckerle M: "AC-Scan: A Design for Test Alternative to Boundary Scan Which Allows Detection of AC Signal Failure Modes" Motorola Technical Developments, Motorola Inc. Schaumburg, Illinois, US vol. 16, Aug. 1, 1992, pp. 157-160, XP000310400 ISSN: 0887-5286.
Graham et al: "AC Interconnect Test With Series Boundary Scan" IP.COM Journal, IP.COM Inc., West Henrietta, NY, US, Nov. 1, 1991, XP013110069 ISSN: 1533-0001.

* cited by examiner

*Primary Examiner*—Nadeem Iqbal
(74) *Attorney, Agent, or Firm*—Wall & Tong, LLP

(57) ABSTRACT

The invention includes a method and apparatus for injecting dynamic faults in a circuit device. The apparatus includes a first register adapted with selection data identifying selected ones of a plurality of outputs of the circuit device and/or selected ones of a plurality of error registers of the circuit device, a second register adapted with dynamic fault data for propagation toward the selected ones of the outputs of the circuit device and/or the selected ones of the error registers of the circuit device, and a controller for applying the selection data to the first register and the dynamic fault data to the second register in a manner for providing a dynamic fault on each of the selected ones of the outputs of the circuit device and/or each of the selected ones of the error registers of the circuit device.

25 Claims, 6 Drawing Sheets

200

(12) United States Patent
US 7,689,866 B2

METHOD AND APPARATUS FOR INJECTING TRANSIENT HARDWARE FAULTS FOR SOFTWARE TESTING

FIELD OF THE INVENTION

The invention relates to the field of electronic systems and, more specifically, to system software testing using hardware fault injection.

BACKGROUND OF THE INVENTION

In general, electronic systems used in a variety of applications require a high degree of operational reliability. For example, electronic systems in telecommunications networks often require a certain degree of operational reliability. Similarly, for example, computer systems used in various other applications, such as transaction processors, web servers, airline traffic control systems, and the like, require high degrees of operational reliability. This leads to system designs requiring fault tolerant features in both the hardware and software portions of such electronic systems. Although redundant hardware is typically provided in such systems, systems having high reliability requirements need appropriate testing capabilities for verifying such fault tolerant features.

Due to the increasing complexity of electronic systems, as well as increasing demand for high reliability from electronic systems, testing of electronic systems is performed to ensure that system software detects failure conditions in the system hardware. In existing system software testing schemes, hardware fault injection methods are used to inject static faults into the system hardware in order to determine whether the system software detects the static faults. For example, static faults such as stuck_at and stuck_open may be injected into the electronic system in order to determine if the system software detects these static faults. Disadvantageously, however, support for testing dynamic faults does not currently exist.

SUMMARY OF THE INVENTION

Various deficiencies in the prior art are addressed through the invention of a method and apparatus for injecting dynamic faults in a circuit device. The apparatus includes a first register adapted with selection data identifying selected ones of a plurality of outputs of the circuit device and/or selected ones of a plurality of error registers of the circuit device, a second register adapted with dynamic fault data for propagation toward the selected ones of the outputs of the circuit device and/or the selected ones of the error registers of the circuit device, and a controller for applying the selection data to the first register and the dynamic fault data to the second register in a manner for providing a dynamic fault on each of the selected ones of the outputs of the circuit device and/or each of the selected ones of the error registers of the circuit device.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention, using boundary scan functions, injects dynamic faults into the system hardware of an electronic system in order to determine whether associated system software detects the dynamic faults. Since many complex system design errors behave as dynamic errors, it is important that system software detects occurrences of such dynamic errors immediately. By reusing existing boundary scan structures of chips/boards/systems normally used for injection of static faults (e.g., stuck_at, stuck_open, and like static faults), the present invention enables testing of system software in response to dynamic faults (e.g., timing faults, transient faults, and the like) with minimal system hardware or software modifications.

Figure 1:
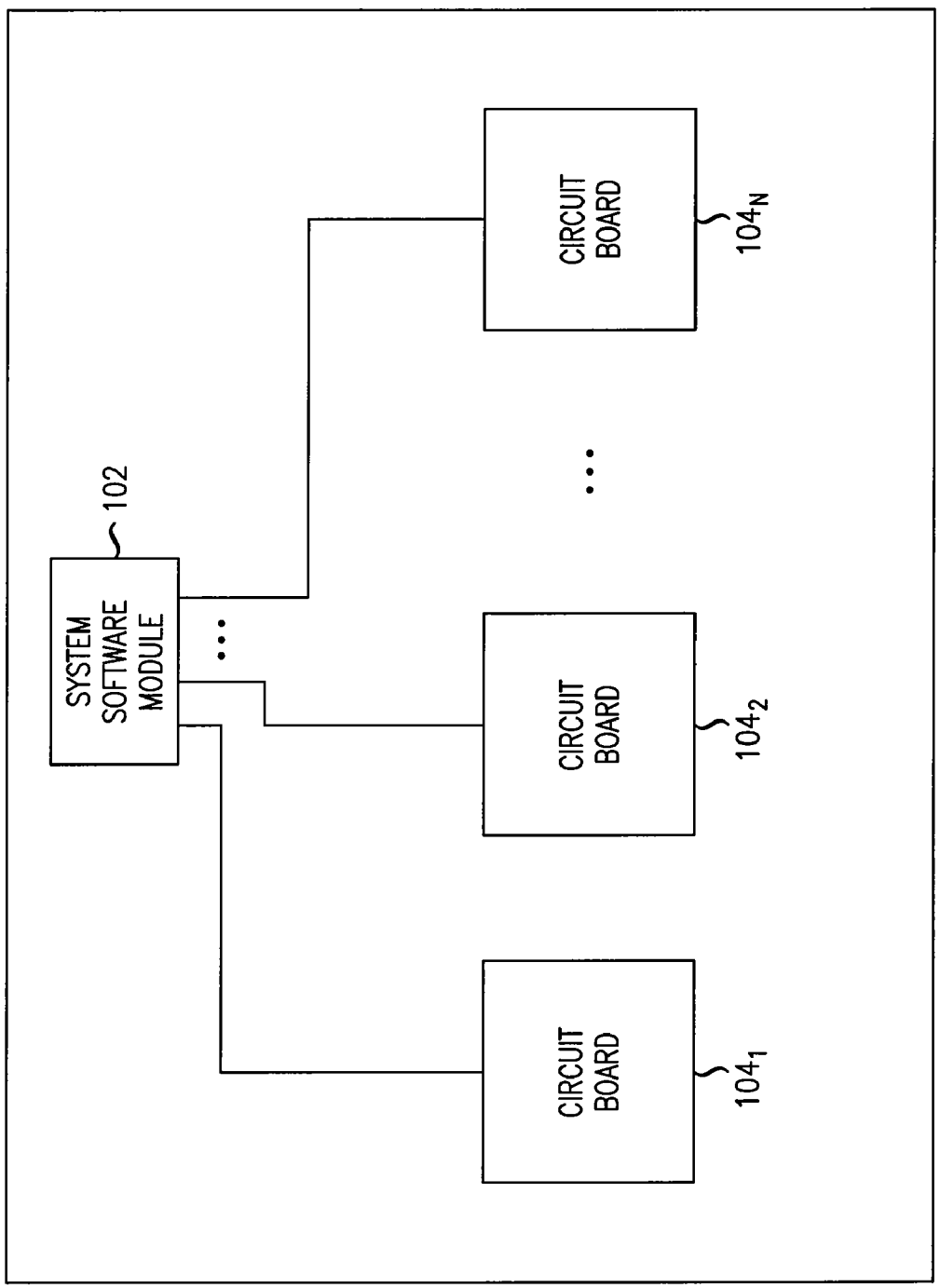
FIG. 1 depicts a high-level block diagram of an exemplary system in which the present invention may be implemented.

FIG. 1 depicts a high-level block diagram of an exemplary system in which the present invention may be implemented. Specifically, exemplary system 100 includes a system software module 102 in communication with a plurality of circuit boards $104_1$-$104_N$ (collectively, circuit boards 104). The system software module 102 includes functional software adapted to perform any system functions (e.g., transmit signals to circuit boards 104, receive signals from circuit boards 104, and the like, as well as various combinations thereof). The circuit boards 104 may perform any hardware functions. Since exemplary system 100 may include any electronic system, system software module 102 and associated circuit boards 104 may be operable for performing any functions. The present invention is not intended to be limited by functionality of exemplary system 100.

In one embodiment, system software module 102 may include testing software adapted for testing functional software of system software module 102. In one embodiment, testing software is adapted for testing functional software in order to verify that the functional software accurately detects faults associated with circuit boards 104. In one embodiment, testing software is adapted for testing functional software in order to verify that the functional software accurately detects dynamic faults (e.g., timing faults, transient faults, and the like, as well as various combinations thereof). In one embodiment, depending upon functions supported by functional software of system software module 102, testing software is adapted for testing functional software in order to verify that the functional software is operable for initiating one or more actions responsive to detecting faults associated with circuit boards 104, obtaining fault information responsive to detecting faults associated with circuit boards 104, and the like, as well as various combinations thereof.

Figure 2:
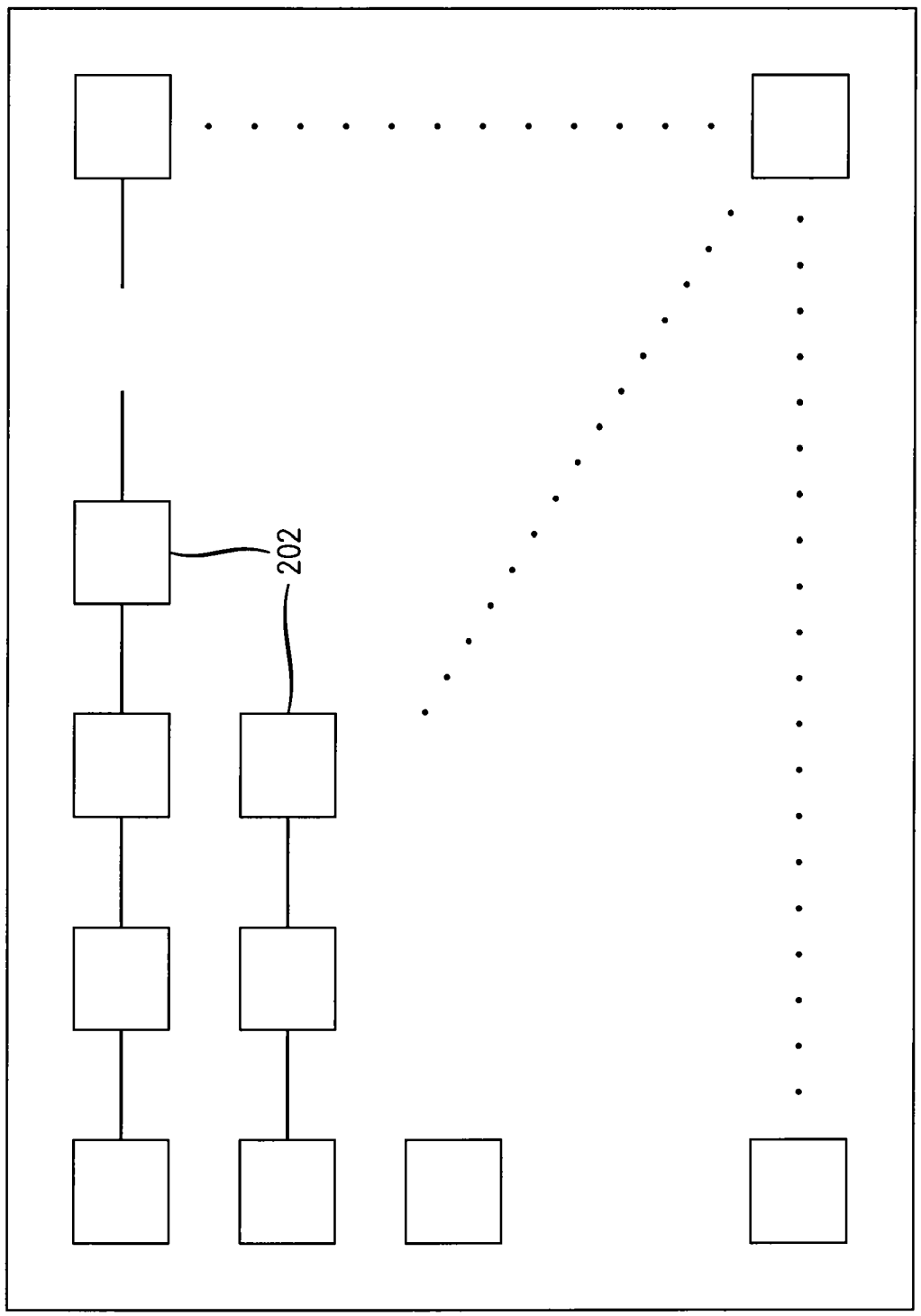
FIG. 2 depicts a high-level block diagram of an exemplary circuit board from the exemplary system of FIG. 1.

FIG. 2 depicts a high-level block diagram of an exemplary circuit board from the exemplary system of FIG. 1. Specifically, exemplary circuit board 200 of FIG. 2 includes a plurality of chips 202. The chips 202 may perform any functions. In one embodiment, at least a portion of chips 202 may be configurable logic blocks (e.g., field programmable gate arrays (FPGAs)). In one embodiment, chips 202 include boundary scan functionality which enables controllability and observability of boundary pins for providing various control functions, testing functions, and the like, as well as various combinations thereof. The present invention may be better understood with respect to FIG. 3.

Figure 3:
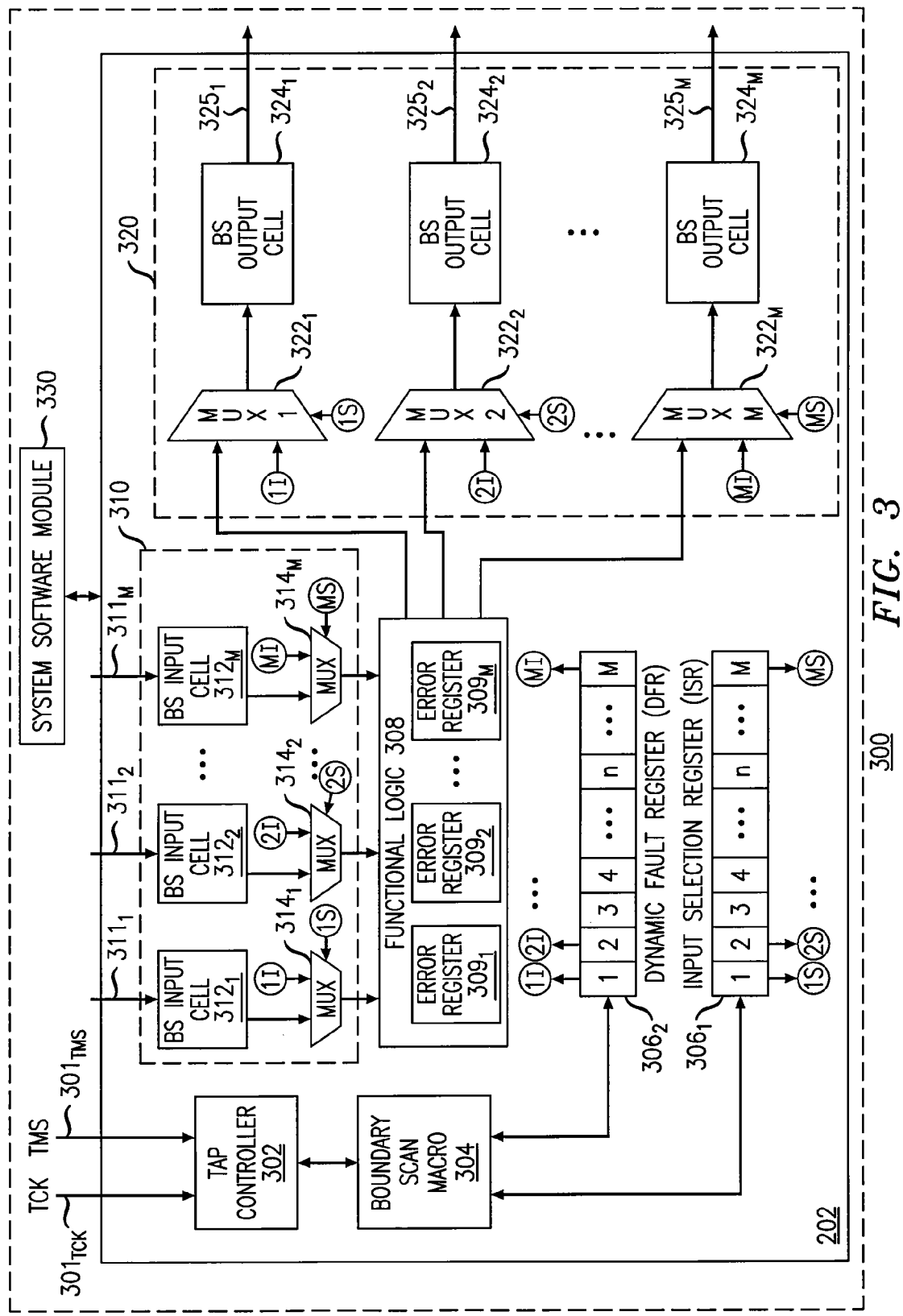
FIG. 3 depicts a high-level block diagram of a portion of a system including an exemplary chip from the exemplary circuit board of FIG. 2.

FIG. 3 depicts a high-level block diagram of a portion of a system including an exemplary chip from the exemplary circuit board of FIG. 2. Specifically, system 300 of FIG. 3 includes exemplary chip 202 and a system software module (SSM) 330. The exemplary chip 202 may be one of a plurality of chips on a circuit board (illustratively, one of the circuit boards 104 depicted and described herein with respect to FIG. 1). The SSM 330 may be system software module 102 depicted and described herein with respect to FIG. 1. As described herein, the present invention may be used to generate and inject dynamic faults at various combinations of the inputs, functional logic, and outputs of exemplary chip 202 in order to test fault detection and response capabilities of SSM 330.

The exemplary chip 202 includes a test clock pin $301_{TCK}$, a test mode select pin $301_{TMS}$, a test access port (TAP) controller 302, a boundary scan macro 304, an input selection register (ISR) $306_1$, a dynamic fault register (DFR) $306_2$, functional logic 308, input logic (IL) 310, output logic (OL) 320. The IL 310 includes a plurality of boundary scan input pins (BSIPs) $311_1$-$311_M$ (collectively, BSIPs 311), a plurality of boundary scan input cells (BSICs) $312_1$-$312_M$ (collectively, BSICs 312), and a plurality of input multiplexers (IMUXs) $314_1$-$314_M$ (collectively, IMUXs 314). The OL 320 includes a plurality of output multiplexers (OMUXs) $322_1$-$322_M$ (collectively, OMUXs 322), a plurality of boundary scan output cells (BSOCs) $324_1$-$324_M$ (collectively, BSOCs 324), and a plurality of boundary scan output pins (BSOPs) $325_1$-$325_M$ (collectively, BSOPs 325).

The TAP controller 302 is operable for controlling operations of exemplary chip 202 by controlling various components of exemplary chip 202. In one embodiment, TAP controller 302 operates as a state machine for controlling operations of exemplary chip 202. In one embodiment, TAP controller 302 controls operations of exemplary chip 202 in response to various input signals received over input pins. The test clock pin $301_{TCK}$ and test mode select pin $301_{TMS}$ provide clock signals and test mode select signals, respectively, to TAP controller 302. The TAP controller 302 may control processing of input signals by exemplary chip 202. Although omitted for purposes of clarity, in one embodiment, TAP controller 302 may receive various signals from other chips, boards, systems, and the like, as well as various combinations thereof for controlling operations of exemplary chip 202.

As depicted in FIG. 3, ISR $306_1$ includes m storage locations, where storage locations 1-m are associated with BSICs $312_1$-$312_M$ and IMUXs $314_1$-$314_M$ at the input, ERs $309_1$-$309_M$ in functional logic 308, and OMUXs $322_1$-$322_M$ and BSOCs $324_1$-$324_M$ at the output, respectively. The m storage locations of ISR $306_1$ are associated with selection inputs of IMUXs $314_1$-$314_M$, respectively. The m storage locations of ISR $306_1$ are associated with selection inputs of OMUXs $322_1$-$322_M$, respectively. The ISR $306_1$ is adapted for receiving an input selection vector including m values (m input selection bits) from TAP controller 302 via boundary scan macro 304. The TAP controller 302 controls scanning of input selection vectors into ISR $306_1$. The m storage locations of ISR $306_1$ are adapted for storing the m values of the input selection vector, respectively.

As depicted in FIG. 3, DFR $306_2$ includes m storage locations, where storage locations 1-m are associated with BSICs $312_1$-$312_M$ and IMUXs $314_1$-$314_M$ at the input, ERs $309_1$-$309_M$ in functional logic 308, and OMUXs $322_1$-$322_M$ and BSOCs $324_1$-$324_M$ at the output, respectively. The m storage locations of DFR $306_2$ are associated with second inputs of IMUXs $314_1$-$314_M$, respectively. The m storage locations of DFR $306_2$ are associated with second inputs of OMUXs $322_1$-$322_M$, respectively. The DFR $306_2$ is adapted for receiving a dynamic fault vector including m values (m dynamic fault bits) from TAP controller 302 via boundary scan macro 304. The TAP controller 302 controls scanning of dynamic fault vectors into ISR $306_2$. The m storage locations of DFR $306_2$ are adapted for storing the m values of the dynamic fault vector, respectively.

The TAP controller 302 connects to ISR $306_1$ and DFR $306_2$ using boundary scan instructions identifying ISR $306_1$ and DFR $306_2$, respectively. For example, in one embodiment, in which ISR $306_1$ and DFR $306_2$ are implemented as USR1 and USR2 registers of a XILINX FPGA, respectively, boundary scan instructions of USR1 and USR2 (or similar USER instructions of FPGAs of other companies such as ALTERA, ORCA, LATTICE, and the like), executed by TAP controller 302, may be used to connect ISR $306_1$ and DFR $306_2$ to TAP controller 302, respectively. Once ISR $306_1$ is connected to the boundary scan chain through TAP controller 302, TAP controller 302 may load an input selection vector into ISR $306_1$ by scanning the input selection bit pattern into ISR $306_1$ by executing a SAMPLE/PRELOAD instruction. Once DFR $306_2$ is connected to the boundary scan chain through TAP controller 302, TAP controller 302 may load dynamic fault vector into DFR $306_2$ by scanning the dynamic fault bit pattern into DFR $306_2$ by executing a SAMPLE/PRELOAD instruction.

The BSICs 312 and BSOCs 324 include boundary scan cells. In one embodiment, at least a portion of BSICs 312 may include one or more respective storage elements (e.g., input registers). In one embodiment, at least a portion of BSOCs 324 may include one or more respective storage elements and one or more associated multiplexers for selecting various combinations of output data). Although omitted for purposes of clarity, in one embodiment, at least a portion of BSICs 312 may be interconnected (e.g., forming a chain of boundary scan cells) and at least a portion of BSOCs 324 may be interconnected (e.g., forming a chain of boundary scan cells). In one embodiment, at least a portion of BSICs 312 and BSOCs 324 may be interconnected (e.g., forming a chain of boundary scan cells).

As depicted in FIG. 3, BSIPs $311_1$-$311_M$ propagate input signals received from various other components (e.g., chips, boards, and the like, as well as various combinations thereof) to respective inputs of BSICs $312_1$-$312_M$, respectively. The outputs of BSICs $312_1$-$312_M$ are coupled to respective first inputs of IMUXs $314_1$-$314_M$, respectively. The storage locations 1-m of DFR $306_2$ are coupled to respective second inputs of IMUXs $314_1$-$314_M$, respectively. As depicted in FIG. 3, each of IMUXs $314_1$-$314_M$ is controllable using storage locations 1-m of ISR $306_1$ such that IMUXs $314_1$-$314_M$ may individually select input from either BSICs $312_1$-$312_M$ coupled to respective first inputs of IMUXs $314_1$-$314_M$, respectively, or storage locations 1-m of DFR $306_2$ coupled to respective second inputs of IMUXs $314_1$-$314_M$, respectively. The outputs of IMUXs $314_1$-$314_M$ are coupled to respective inputs of functional logic 308.

As described herein, each of IMUXs $314_1$-$314_M$ is controllable using ISR $306_1$. As depicted in FIG. 3, each of the storage locations 1-m of ISR $306_1$ are associated with selection inputs of IMUXs $314_1$-$314_M$, respectively, such that selection bits in respective storage locations 1-m of ISR $306_1$ are applied to the selection inputs of IMUXs $314_1$-$314_M$ to individually control IMUXs $314_1$-$314_M$. In one embodiment, an input selection bit of zero applied to the selection input of an IMUX 314 enables the IMUX 314 to select input from the associated BSIC 312 (such that functional input data, as opposed to dynamic fault data, appears at the corresponding input to functional logic 308) and an input selection bit of one applied to the selection input of an IMUX 314 enables the IMUX 314 to select input from the corresponding storage location of DFR $306_2$ (such that dynamic fault data from that storage location of DFR $306_2$, as opposed to functional input data from the associated BSIC 312, appears at the corresponding input to functional logic 308). In another embodiment, opposite values may be used for controlling selection of data from respective inputs of IMUXs 314.

The functional logic 308 may interoperate with SSM 330 for performing various functions of exemplary chip 202. The functional logic 308 may include any functional logic adapted for being implemented in an electronic system and, as such, may vary depending on the chip on which functional logic 308 is implemented, the circuit board on which functional logic 308 is implemented, the system in which functional logic 308 is implemented, and the like, as well as various combinations thereof. For example, functional logic 308 may be configured to support functions associated with telecommunications systems, computer control systems, airline traffic control systems, and the like, as well as various combinations thereof.

The respective outputs of functional logic 308 (which corresponding to the respective inputs of functional logic 308) are coupled to respective first inputs of OMUXs $322_1$-$322_M$, respectively. The storage locations 1-m of DFR $306_2$ are coupled to respective second inputs of OMUXs $322_1$-$322_M$, respectively. As depicted in FIG. 3, each of OMUXs $322_1$-$322_M$ is controllable using storage locations 1-m of ISR $306_1$ such that OMUXs $322_1$-$322_M$ may individually select input from either respective outputs of functional logic 308 coupled to respective first inputs of OMUXs $322_1$-$322_M$, respectively, or storage locations 1-m of DFR $306_2$ coupled to respective second inputs of OMUXs $322_1$-$322_M$, respectively. The outputs of OMUXs $322_1$-$322_M$ are coupled to respective inputs of BSOCs $324_1$-$324_M$, respectively. The BSOCs $324_1$-$324_M$ propagate received output signals toward various other components (e.g., chips, boards, and the like, as well as various combinations thereof) over BSOPs $325_1$-$325_M$, respectively.

As described herein, each of OMUXs $322_1$-$322_M$ is controllable using ISR $306_1$. As depicted in FIG. 3, each of the storage locations 1-m of ISR $306_1$ are associated with selection inputs of OMUXs $320_1$-$320_M$, respectively, such that selection bits in respective storage locations 1-m of ISR $306_1$ are applied to the selection inputs of OMUXs $320_1$-$320_M$ to individually control OMUXs $320_1$-$320_M$. In one embodiment, an input selection bit of zero applied to the selection input of an OMUX 320 enables the OMUX 320 to select input from the associated output of functional logic 308 (such that functional output data, as opposed to dynamic fault data, appears at the corresponding input to the associated BSOC 324) and an input selection bit of one applied to the selection input of an OMUX 320 enables the OMUX 320 to select input from the corresponding storage location of DFR $306_2$ (such that dynamic fault data from that storage location of DFR $306_2$, as opposed to functional output data from the associated output of functional logic 308, appears at the corresponding input to the associated BSOC 324). In another embodiment, opposite values may be used for controlling selection of data from respective inputs of OMUXs 320.

In a system mode of operation, IMUX 314 is controlled (using an associated selection bit of ISR $306_1$) to select input data from an associated BSIC 312 (rather than from DFR $306_2$). The IMUX 314 provides input data from the associated BSIC 312 to functional logic 308. The functional logic 308 processes the input data received from associated BSIC 312. The functional logic 308 produces output data. The functional logic 308 provides the output data to an associated OMUX 320 which is controlled (using the associated selection bit of ISR $306_1$) to select output data from functional logic 308 (rather than from DFR $306_2$). The OMUX 320 provides the output data from functional logic 308 to the associated BSOC 322 for transmission toward another circuit, device, and the like.

In a testing mode of operation, with respect to the input portion of exemplary chip 202, each IMUX 314 is controlled (using an associated selection bit of ISR $306_1$) to select dynamic fault data from the associated bit position of DFR $306_2$ (rather than selecting input data from the associated BSIC 312). Depending on testing being performed, the dynamic fault data may be stored in the corresponding error register 309. Since SSM 330 is supposed to monitor the error registers 309 in order to detect dynamic faults in exemplary chip 202, successful detection by SSM 330 of the dynamic fault data in the error register 309 provides an indication that SSM 330 is properly detecting the type of dynamic fault being tested, while failure by SSM 330 to detect the dynamic fault data in the error register 309 provides an indication that SSM 330 is not properly detecting the type of dynamic fault being tested.

In a testing mode of operation, with respect to the output portion of exemplary chip 202, each OMUX 314 is controlled (using an associated selection bit of ISR $306_1$) to select dynamic fault data from the associated bit position of DFR $306_2$ (rather than selecting output data from the associated output of functional logic 308). The dynamic fault data is propagated to the associated BSOC 322 for transmission over the associated BSOP 324. Since SSM 330 is supposed to monitor the BSOPs 324 in order to detect dynamic faults in exemplary chip 202, successful detection by SSM 330 of the dynamic fault data on the associated BSOP 324 provides an indication that SSM 330 is properly detecting the type of dynamic fault being tested, while failure by SSM 330 to detect the dynamic fault data on the associated BSOP 324 provides an indication that SSM 330 is not properly detecting the type of dynamic fault being tested.

As depicted in FIG. 3, by scanning various combinations of input selection vectors and dynamic fault vectors into ISR $306_1$ and DFR $306_2$, respectively, TAP controller 302 controls which portions of IL 310, functional logic 308, and OL 320 are operating in the system mode of operation and which portions of IL 310, functional logic 308, and OL 320 are operating in the testing mode of operation. The TAP controller 302 controls generation of dynamic faults, and injection of the dynamic faults into exemplary chip 202. By controlling injection of dynamic faults into exemplary chip 202, TAP controller 302 thereby drives the testing of various dynamic fault detection functions and features supposed to be supported by SSM 330 in order to ensure that the dynamic fault detection functions and features supported by SSM 330 are operating properly.

As described herein, input selection vectors and dynamic fault vectors may be configured to generate many different dynamic faults. As described herein, control of input selection vectors and dynamic fault vectors by TAP controller 302 (e.g., order in which vectors are scanned, rate at which vectors are scanned, and the like, as well as various combinations thereof) may be configured to generate various different dynamic faults. In one embodiment, TAP controller 302 executes code configured to scan various combinations of input selection vectors and dynamic fault vectors into ISR $306_1$ and DFR $306_2$, respectively, in order to inject various different dynamic faults into exemplary chip 202. As described herein, dynamic faults are injected into exemplary chip 202 for testing the capability of system software (illustratively, SSM 330) to detect such dynamic faults.

Although primarily described herein with respect to injection of dynamic faults using ISR $306_1$ and DFR $306_2$, in one embodiment, dynamic faults may be injected into exemplary chip 202 using at least one other dynamic fault injection mechanism. In one embodiment, for example, dynamic faults may be injected using various other components of exemplary chip 202. For example, in one embodiment, dynamic faults may be injected through boundary scan cells (e.g., BSICs 312 and BSOCs 324). In one embodiment, for example, dynamic faults may be injected using other components of the exemplary chip in which dynamic faults are injected (e.g., other portions of functional logic 308, as well various combinations of instruction registers, data registers, and the like, as well as various combinations thereof). In one embodiment, dynamic faults may be injected from other chips coupled to exemplary chip 202.

As depicted in FIG. 3, exemplary chip 202 of FIG. 3 communicates with a software module (illustratively, SSM 330). The SSM 330 may include a chip level software module (e.g., a chip-level processor, microcontroller, and the like), a board-level software module (e.g., a board-level processor, a board-level microcontroller, and the like), a system-level software module (e.g., a board-level processor, microcontroller, and the like), and the like, as well as various combinations thereof. As described herein, software module 320 may communicate with various components of exemplary chip 202 (e.g., at least one of TAP controller 302, boundary scan macro 304, ISR $306_1$, DFR $306_2$, BSICs 310, IMUXs 312, functional logic 308, ERs 309, OMUXs 322, BSOCs 324, and the like, as well as various combinations thereof).

As described herein, dynamic faults generated and injected using the present invention enable testing of software (e.g., system level software, board-level software, chip-level software, and the like, as well as various combinations thereof). The dynamic faults generated and injected using the present invention enable software testing during various points in the system lifecycle (e.g., for pre-integration component tests, integration system tests, pre-deployment system tests, post-deployment system test, and the like, as well as various combinations thereof). The system software tested using the present invention may use any means for detecting dynamic faults injected using the present invention. The present invention is not intended to be limited by the means by which system software detects injected dynamic faults.

In one embodiment, system software (illustratively, SSM 330) may detect injected dynamic faults by monitoring one or more components of the chip in which the dynamic fault is injected (e.g., input pins, input registers, error registers, output registers, output pins, and the like, as well as various combinations thereof), monitoring one or more components of one or more chips downstream from the chip in which the dynamic fault is injected (e.g., input pins, input registers, error registers, output registers, output pins, and the like, as well as various combinations thereof of downstream chips), monitoring various other system components (e.g., other chips, boards, modules, and the like, as well as various combinations thereof), and the like, as well as various combinations thereof.

As described herein, system software (illustratively, SSM 330) may perform any function in response to detecting dynamic faults generated and injected using the present invention. The functions may generally include at least one of performing one or more actions in response to detecting injected dynamic faults, obtaining diagnostic information in response to detecting injected dynamic faults, and the like, as well as various combinations thereof. In one embodiment, performed actions, obtained diagnostic information, and the like may vary according to the system being tested. For example, at least a portion of the performed actions and obtained diagnostic information in a telecommunications system may differ from at least a portion of the performed actions and obtained diagnostic information in an airline traffic control system. The present invention is not intended to be limited by the response of system software to detected injected dynamic errors.

Figure 4:
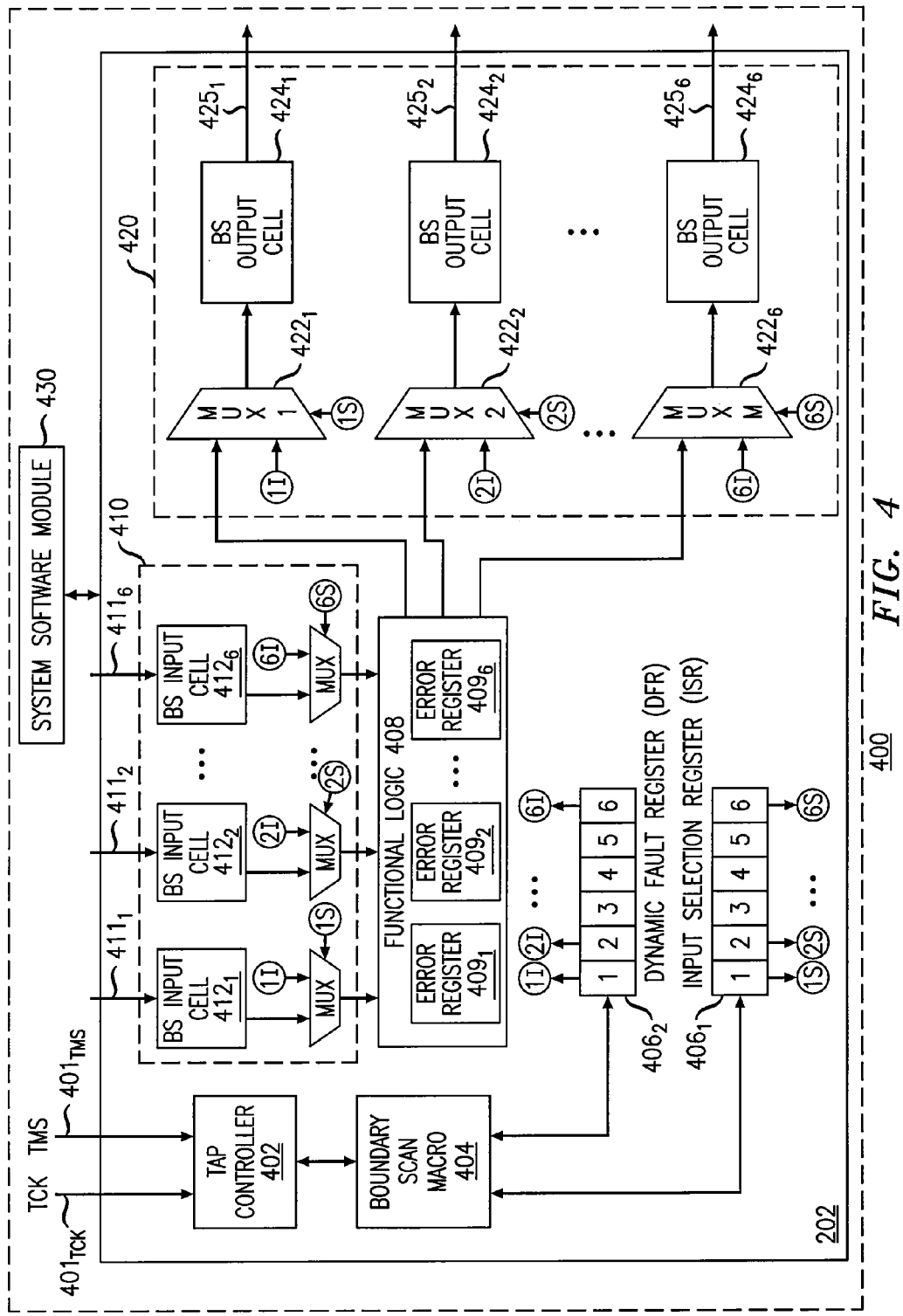
FIG. 4 depicts a high-level block diagram of an exemplary implementation of the exemplary system of FIG. 3.

FIG. 4 depicts a high-level block diagram of an exemplary implementation of the exemplary system of FIG. 3. Specifically, exemplary system implementation 400 includes an exemplary chip 202 and a system software module (SSM) 430. The exemplary system implementation 400 depicted and described with respect to FIG. 4 operates substantially as depicted and described herein with respect to exemplary chip 202 of FIG. 3, however, operation of exemplary system implementation 400 of FIG. 4 may be better understood with respect to the following description with respect to generation and injection of dynamic faults for testing system software.

As depicted in FIG. 4, exemplary chip 202 includes a test clock pin $401_{TCK}$, a test mode select pin $401_{TMS}$, a test access port (TAP) controller 402, a boundary scan macro 404, an input selection register (ISR) $406_1$, a dynamic fault register (DFR) $406_2$, functional logic 408, input logic (IL) 410, and output logic (OL) 420. The IL 410 includes six of each of BSIPs $411_1$-$411_6$ (collectively, BSIPs 411), BSICs $412_1$-$412_6$ (collectively, BSICs 412), and IMUXs $414_1$-$414_6$ (collectively, IMUXs 414). The OL 320 includes six of each of OMUXs $422_1$-$422_6$ (collectively, OMUXs 422), BSOCs $424_1$-$424_6$ (collectively, BSOCs 324), and BSOPs $425_1$-$425_M$ (collectively, BSOPs 425). The ISR $406_1$ and DFR $406_2$ include six storage locations (denoted as 1 through 6) for storing 6-bit input selection vectors and 6-bit dynamic fault vectors, respectively, scanned by TAP controller 402.

As described herein, input selection vectors and dynamic fault vectors may be configured for producing various dynamic faults adapted for testing functional software. For example, assume that one or more fault detection (and, optionally, fault response) functions of SSM 430 are to be tested by injecting a dynamic fault at ER $409_4$ and associated BSOP $425_4$. Although described with respect to an example in which a dynamic fault is injected for a single ER 309 and/or BSOP 425, as described herein, dynamic faults may be injected at various combinations of ERs 309 and/or BSOPs 425 for testing one or more fault detection (and, optionally, fault response) functions of SSM 430.

The TAP controller 402 executes an instruction to connect to ISR $406_1$. In this example, TAP controller 402 scans an input selection vector of "000010" into ISR $406_1$. The input selection vector "000010" indicates that IMUXs $414_1$-$414_3$ and $414_5$-$414_6$, and associated OMUXs $422_1$-$422_3$ and $422_5$-$422_6$ operate in system mode (selecting input data from BSICs $412_1$-$412_3$ and $412_5$-$412_6$, respectively, and selecting functional logic data from respective outputs of functional logic 408 for propagation toward BSOCs 424₁-424₃ and 424₅-424₆, respectively). The input selection vector "000010" indicates that IMUX 414₄ and associated OMUX 422₄ operate in testing mode (such that IMUX 414₄ selects dynamic fault data from bit position 4 of DFR 406₂ for propagation toward ER 409₄ and OMUX 422₄ selects dynamic fault data from bit position 4 of DFR 406₂ for propagation toward BSOP 425₄).

The TAP controller 402 executes an instruction to switch from connecting to ISR 406₁ to connecting to DFR 406₂. The TAP controller 402 executes one or more instructions to scan one or more respective dynamic fault vectors into DFR 406₂. Table 1 depicts a set of dynamic fault vectors adapted for producing an exemplary timing pulse fault on ER 409₄ and/or BSOP 425₄. As depicted in Table 1, each column corresponds to one of the 6 storage locations of 6-bit DFR 406₂ (labeled as DFRBit-1 through DFRBit-6 associated with IMUXs 414₁-414₆ and OMUXs 422₁-422₆, respectively). As depicted in Table 1, each row corresponds to a different dynamic fault vector that TAP controller 402 scans into DFR 406₂ in order to generate a timing pulse. Although primarily depicted and described with respect to a timing pulse in which logic high (i.e., 1) denotes the pulse of the dynamic fault, in other embodiments, logic low (i.e., 0) may denote the pulse of the dynamic fault.

TABLE 1

|  | DFRBit-1 | DFRBit-2 | DFRBit-3 | DFRBit-4 | DFRBit-5 | DFRBit-6 |
| --- | --- | --- | --- | --- | --- | --- |
| Vector 1 | 0 | 0 | 1 | 0 | 0 | 0 |
| Vector 2 | 0 | 0 | 0 | 1 | 0 | 0 |
| Vector 3 | 0 | 0 | 0 | 0 | 1 | 0 |
| Vector 4 | 0 | 0 | 0 | 0 | 0 | 0 |

The TAP controller 402 scans the dynamic fault vectors of Table 1 into DFR 406₂ in sequence. Since IMUX 414₄ is set, according to the scanned input selection values of ISR 406₁, to select input from the second input of IMUX 414₄, IMUX 414₄ selects the DFRBit-4 values as TAP controller 402 scans the dynamic fault vectors into DFR 406₂. Upon selection of the DFRBit-4 values, IMUX 414₄ propagates the DFRBit-4 values toward ER 409₄ of functional logic 408. Since OMUX 422₄ is set, according to the scanned input selection values of ISR 406₁, to select input from the second input of OMUX 422₄, OMUX 422₄ selects the DFRBit-4 values as TAP controller 402 scans the dynamic fault vectors into DFR 406₂. Upon selection of the DFRBit-4 values, OMUX 422₄ propagates the DFRBit-4 values toward BSOC 424₄ and BSOP 425₄.

The TAP controller 402 scans the dynamic fault vectors of Table 1 into DFR 406₂ in sequence such that logic values 0, 1, 0, 0 appear, in sequence, on the second inputs of IMUX 414₄ and OMUX 422₄, respectively, thereby resulting in a timing pulse on the second input of IMUX 414₄ and an identical timing pulse on the second input of OMUX 422₄, respectively. The identical timing pulses injected at the second inputs of IMUX 414₄ and OMUX 422₄, respectively, each have a high portion (denoted as T_pulse) and a low portion (denoted as T_offset). The duration of T_offset (during which three logic "0"s are input) is three times the duration of T_pulse (during which the logic "1" is input). Although primarily described with respect to generation and injection of a dynamic fault having a single timing pulse, in one embodiment, dynamic faults having various combinations of timing pulses may be generated and inserted by TAP controller 402 using various combinations of instructions.

In one embodiment, for example, dynamic faults having various combinations of timing pulses may be generated and injected by scanning dynamic fault vectors having various combinations of dynamic fault bits. In one embodiment, for example, dynamic faults having various combinations of timing pulses may be generated and injected by scanning dynamic fault vectors using various combinations of instructions adapted for modifying the rate at which timing pulses are generated, the frequency with which timing pulses are generated, and the like, as well as various combinations thereof. Although primarily described with respect to specific parameters (e.g., T_pulse, T_offset, and the like) which may be adapted using various combinations of TAP controller instructions, depending on the dynamic fault being generated and injected, various other parameters may be adapted for generating and injecting other dynamic faults.

In continuation of the previous example, for example, TAP controller 402 may scan the vectors in the vector set shown in Table 1 into DFR 406₂ in sequence a plurality of times (e.g., three times) such that logic values 0, 1, 0, 0, 0, 1, 0, 0, 0, 1, 0, 0 appear, in sequence, on the second inputs of IMUX 414₄ (for propagation to ER 409₄) and OMUX 422₄ (for propagation to BSOC 424₄ and BSOP 425₄), respectively, thereby resulting in a timing pulse train (timing waveform) having an initial low portion followed by three high portions (each of duration T_pulse) and three low portions (each of duration T_offset). In continuation of the previous example, exemplary pseudo code executed by TAP controller 402 to generate the three-pulse timing waveform described hereinabove with respect to Table 1 follows:

Apply TAP Reset;
    Apply ISR_instruction;
    Scan Data Reg ISR_REG "000010"
    Apply DFR_instruction;
    LOOP: PULSE_GEN
    Scan Data Reg DFR_REG "001000"
    Scan Data Reg DFR_REG "000100"
    Scan Data Reg DFR_REG "000010"
    Repeat "Scan Data Reg DFR_REG "000000" N Times;
    REPEAT LOOP PULSE_GEN 3 times.

Figure 5:
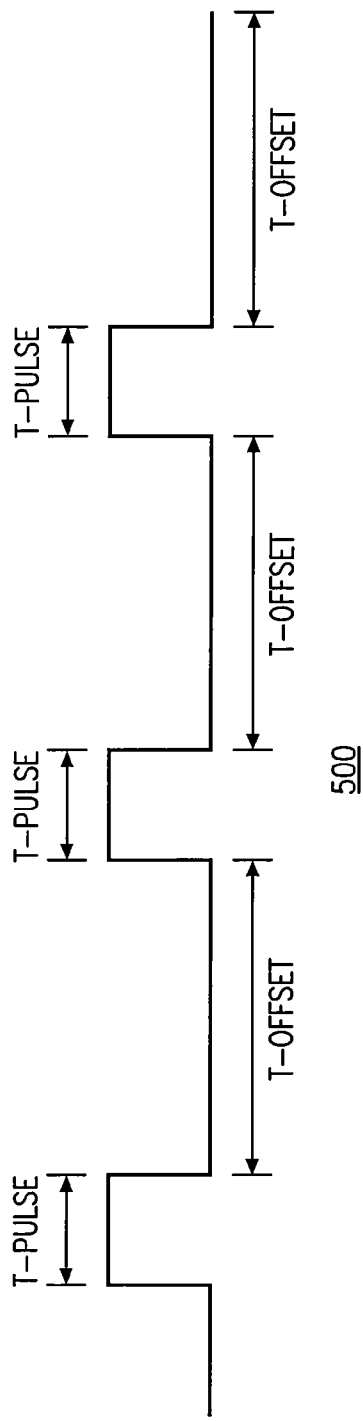
FIG. 5 depicts an exemplary timing pulse producing a timing fault.

As depicted and described with respect to Table 1, the instruction "Repeat "Scan Data Reg DFR_REG "000000" N Times" is performed one time (i.e., N=1) such that (in conjunction with the pair of Scan Data Reg DFR_REG "000000" instructions) the duration T_offset between timing pulses in the timing waveform is three times the associated duration T_pulse of each of the three timing pulses. In one embodiment, T_offset may be increased by increasing the value of N. For example, increasing the value of N from one to four results in a T_offset between timing pulses in the timing waveform that is six times the associated duration T_pulse of each of the three timing pulses. FIG. 5 depicts the exemplary dynamic fault (i.e., timing waveform) generated by the exemplary pseudo code depicted and described hereinabove.

Although primarily depicted and described with respect to a specific dynamic fault, various different dynamic faults (having associated dynamic fault waveforms) may be generated and injected using various embodiments of the present invention. In one embodiment, different dynamic faults (e.g., dynamic fault waveforms) generated using various embodiments of the present invention may be configurable by controlling various dynamic fault waveform parameters (e.g., T_pulse, T_offset, and the like, as well as various combinations thereof). Although primarily described herein with respect to specific parameters controllable for configuring dynamic faults (e.g., T_pulse and T_offset), depending on the dynamic fault generated using the present invention, various other parameters may be controlled to configure various other dynamic faults.

As described herein, by configuring various parameters (e.g., dynamic fault vector values, sequences of timing fault vectors, and the like), various different timing faults may be generated and injected for testing system software. In one embodiment, parameters associated with a dynamic fault may be configured by modifying dynamic fault vector values. In one embodiment, parameters associated with a dynamic fault may be configured by controlling the rate at which TAP controller 402 scans dynamic fault vectors into DFR 406$_2$. In one embodiment, parameters associated with a dynamic fault may be configured using various combinations of instructions executed by TAP controller 402.

In one embodiment, parameters associated with a dynamic fault may be configured according to the operation of the TAP controller state machine. For example, assume TAP controller 402 implements a TAP state machine implemented by IEEE 1149.1. In this example, it is clear from the run_test_idle state that a minimum of 5 TCK cycles are required in order to reach the update_dr state as follows: run_test_idle→select_dr_scan→capture_dr→shift_dr→exit1_dr→update_dr. In other words, a minimum of 6 TCK cycles is required for a single bit shift on DFR 406$_2$ to take effect. In Table 1, the sequence of vectors from Vector-1 to Vector-4 includes three vectors, each of which is simply a single bit shift of the previous vector.

In continuation of this example, using Table 1, the execution time of each "Scan Data Reg DFR_REG "VECTOR"" instruction requires six clock cycles of TCK. In this example, $T\_pulse \leqq [6*clock\ period\ of\ TCK]$ and $T\_offset \leqq [N*T\_pulse]$. In this example, assuming a TCK clock rate of 1 MHz, with a corresponding clock period of 1000 ns, the corresponding minimum value of T_pulse would be 6 microseconds, and T_offset would be an integer multiplication of the T_pulse value. In this example, assuming a TCK clock rate of 10 MHz, with a corresponding clock period of 100 ns, the corresponding minimum value of T_pulse would be 600 nanoseconds, and T_offset would be an integer multiplication of the T_pulse value.

For example, a telecommunication system may run synchronously using network synchronization signals received by the telecommunication system. In this example, assuming the telecommunication system includes transmitter and receiver circuits sending and receiving data frames in fixed intervals of time (denoted as frame synch signal), such synchronization signals may be used to mark the start and end of the fixed frame synch boundaries. For example, in Universal Mobile Telecommunications System (UMTS) wireless systems, frame interval is standardized to be 10 ms, such that mobile stations and base stations of UMTS systems receive a synchronization signal every 10 ms (and all processing by the transmitter and receiver are synchronized to the externally driven synchronization signals appearing in 10 ms intervals).

In continuation of this example, without use of the present invention, timing circuits must be added to the hardware portion of the UMTS system to check the timing interval of the synchronization pulses. The timing circuits count the time between two consecutive synchronization signals and, if the timing interval is detected to be less than or greater than 10 ms, error flags are set. The system level diagnostic software of the UMTS system continuously monitors such error flags (e.g., using internal error registers) and, in response to detecting that an error flag is set, the system level diagnostic software may trigger a response to the error flag (e.g., restart the UMTS system).

In order to verify that such UMTS synchronization error conditions will be detected by the system level diagnostic software during normal operation of the UMTS system, the fault injection functionality of the present invention may be used in order to test the operation of UMTS system level diagnostic software in response to such UMTS synchronization errors, thereby obviating the need for additional timing circuits to perform such UMTS system level diagnostic software testing. In continuation of this example, using the present invention, dynamic faults may be generated and injected in order to test the operation of UMTS system level diagnostic software. In this example, the present invention may be used to generate transient pulses configured to be less than and greater than 10 ms apart (i.e., the transient pulses simulate a situation in which synchronization of the UMTS system is lost).

In continuation of this example, as described herein, transient pulses configured to be less than or greater than 10 ms apart may be formed by configuring T_pulse and T_offset values. As described herein, the configured transient pulses are injected into the UMTS chip using the boundary scan architecture in order to simulate a lack of synchronization of the UMTS system. In one embodiment, injection of the transient pulses may result in direct setting of the error condition in an error register of the functional logic of the UMTS chip being tested. In one embodiment, the detection of the injected transient pulses by a portion of the functional logic of the UMTS chip being tested may result in one or more error registers of the functional logic being set in a manner by which an associated system software module may detect the lack of synchronization condition. A determination may then be made as to whether the system software module of the UMTS device is properly detecting error conditions indicative of a lack of synchronization.

Although the preceding example is primarily described with respect to injecting a dynamic fault indicative of a lack of synchronization in a UMTS system, the present invention may be used for generating and injecting various other dynamic faults in UMTS systems. Although the preceding example is primarily described with respect to injecting a dynamic fault in a UMTS system, the present invention may be used for generating and injecting various other dynamic faults in various other telecommunication systems (e.g., edge routers, core routers, optical switching systems, cable distribution systems, and the like, as well as various combinations thereof).

Although described with respect to a telecommunication system, the present invention may be used to generate dynamic faults for testing any electronic system (e.g., chips, boards, systems, and the like, as well as various combinations thereof) operable for performing any function (e.g., telecommunications functions, airline traffic control functions, and any other functions which may be performed by electronic systems). Accordingly, the present invention is not intended to be limited to generation, injection, and testing of dynamic faults in systems supporting specific functions. A method for generating and injecting dynamic faults in any electronic system, and testing system software in response to injected dynamic faults, is depicted and described herein with respect to FIG. 6.

Figure 6:
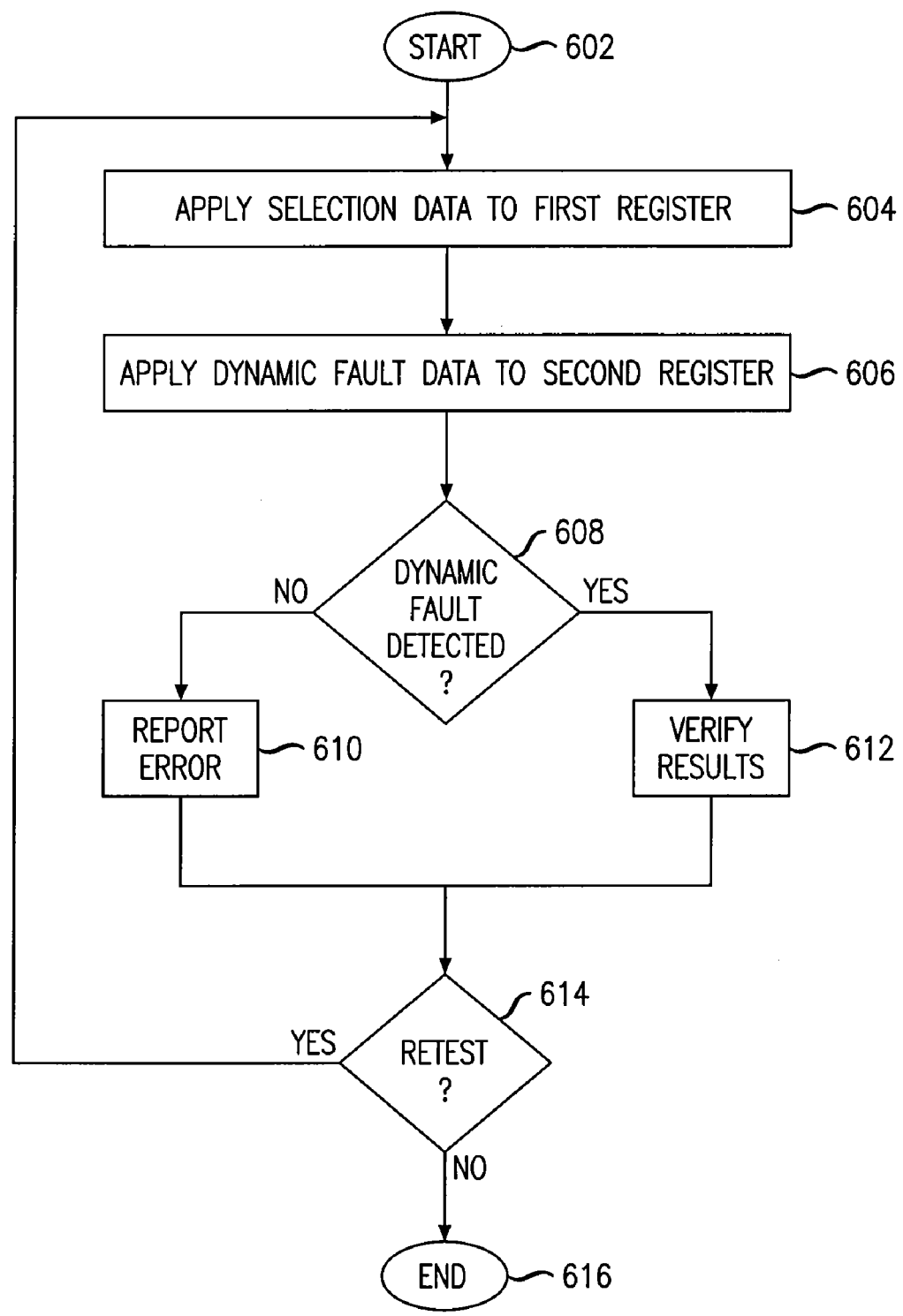
FIG. 6 depicts a method according to one embodiment of the present invention.

FIG. 6 depicts a method according to one embodiment of the present invention. Specifically, method 600 of FIG. 6 depicts a method for injecting dynamic faults in a circuit device. Although depicted as being performed serially, those skilled in the art will appreciate that at least a portion of the steps of method 600 may be performed contemporaneously, or in a different order than presented in FIG. 6. The method 600 begins at step 602 and proceeds to step 604.

At step 604, selection data is applied to a first register (illustratively, ISR $306_1$). At step 606, dynamic fault data is applied to a second register (illustratively, DFR $306_2$). The application of selection data and dynamic fault data produces a dynamic fault at selected error registers and/or selected outputs of the circuit being tested. At step 608, a determination is made as to whether a dynamic fault is detected. In one embodiment, the determination is made as to whether the dynamic fault is detected by functional software associated with the system in which the circuit being tested is disposed. In one embodiment, the determination is made as to whether the dynamic fault is detected by functional software is performed by testing software associated with the system in which the circuit being tested is disposed.

If the dynamic fault is not detected, method 600 proceeds to step 610, at which point an error is reported. In one embodiment, the error is reported by testing software due to the failure of the functional software to detect the dynamic fault. If the dynamic fault is detected, method 600 proceeds to step 612, at which point results are verified. In one embodiment, results may be verified by testing software (e.g., by verifying one or more actions performed by functional software in response to detecting the dynamic fault, processing diagnostic results generated by functional software in response to detecting the dynamic fault, and the like, as well as various combinations thereof). From steps 610 and 612, method 600 proceeds to step 614.

At step 614, a determination is made as to whether to retest the circuit device. In one embodiment, the determination as to whether or not to retest the circuit device may be performed by system software based on the result of the previous test (e.g., whether or not the dynamic fault was detected). In one embodiment, the determination as to whether to retest the circuit device may be made using input received from a user via a user interface adapted for controlling the system in which the circuit device is disposed. If there is a determination that the circuit device is to be retested, method 600 returns to step 604. If there is a determination that the circuit device is not to be retested, method 600 proceeds to step 616, where method 600 ends.

Although primarily described herein with respect to specific boundary scan implementations, those skilled in the art will appreciate that the present invention may be utilized in systems utilizing various other boundary scan implementations (e.g., utilizing other boundary scan architectures, boundary scan controllers, boundary scan cells, boundary scan registers, boundary scan instructions, and the like, as well as various combinations thereof). Although primarily depicted and described herein with respect to specific boundary scan functions, those skilled in the art will appreciate that the present invention may be utilized in systems utilizing various other boundary scan functions. The present invention is not intended to be limited by the boundary scan implementation and associated boundary scan functions modified in accordance with various embodiments of the present invention.

Although primarily depicted and described herein with respect to specific dynamic faults (i.e., specific timing fault waveforms), various other dynamic faults may be generated using various embodiments of the present invention. In one embodiment, for example, the present invention may be used for generating timing fault waveforms, transient fault waveforms, and the like adapted for simulating synchronization errors, data bus noise pulses, interrupt line noise, pulses, and the like, as well as various combinations thereof. Furthermore, although primarily depicted and described herein with respect to specific versions of different dynamic faults (e.g., generation of timing fault waveforms having specific T_pulse and T-offset values), various other versions of various different dynamic faults may be generated using various embodiments of the present invention.

Although primarily described with respect to system software testing using specific dynamic faults, those skilled in the art will appreciate that various other dynamic faults (e.g., cyclic redundancy check testing, parity error testing, system clock testing, system interrupt signal testing, and the like, as well as various combinations thereof) may be generated and injected using the present invention for use in system software testing. The present invention enables testing of system software in response to such dynamic faults, verifying that the system software detects dynamic faults, and, optionally, verifying that the system software responds to dynamic faults and/or provides proper diagnostic information associated with dynamic faults.

Figure 7:
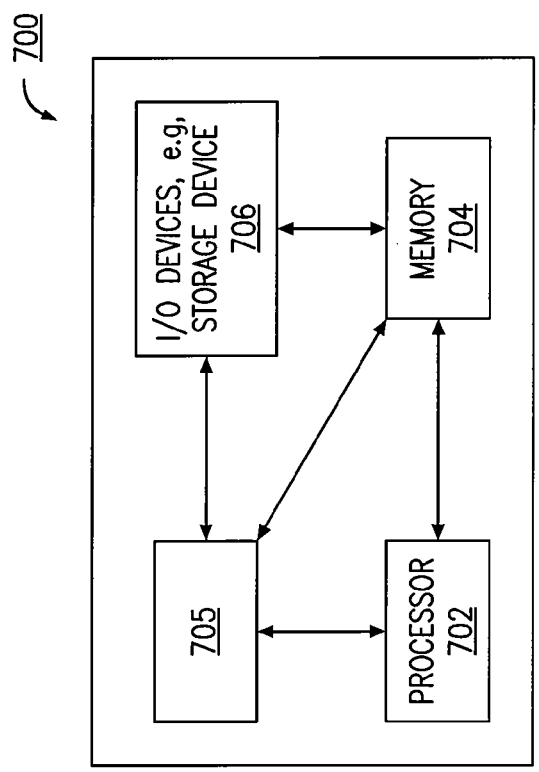
FIG. 7 depicts a high-level block diagram of a general-purpose computer suitable for use in performing at least a portion of the functions described herein.

FIG. 7 depicts a high-level block diagram of a general-purpose computer suitable for use in performing the functions described herein. As depicted in FIG. 7, system 700 comprises a processor element 702 (e.g., a CPU), a memory 704, e.g., random access memory (RAM) and/or read only memory (ROM), a fault injection control module 705, and various input/output devices 706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present fault injection control module or process 705 can be loaded into memory 704 and executed by processor 702 to implement the functions as discussed above. As such, fault injection control process 705 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. An apparatus for injecting dynamic faults in a circuit device, comprising:
   a first register adapted to receive selection data for controlling at least one of:
      a first plurality of data selection devices adapted for controlling propagation of data to functional logic of the circuit device; and a second plurality of data selection devices adapted for controlling propagation of data to output logic of the circuit device;

a second register adapted to receive dynamic fault data to be provided, in a controlled manner based on the selection data, to at least one of the functional logic of the circuit device and the output logic of the circuit device; and a controller for applying the selection data to the first register and the dynamic fault data to the second register in a manner for providing a dynamic fault on at least one of the functional logic and the output logic.

2. The apparatus of claim 1, wherein:
the first register comprises a plurality of bit storage positions associated with at least one of respective data selection devices of the first plurality of data selection devices and respective data selection devices of the second plurality of data selection devices; and
the second register comprises a plurality of bit storage positions associated with at least one of respective data selection devices of the first plurality of data selection devices and respective data selection devices of the second plurality of data selection devices.

3. The apparatus of claim 1, wherein each data selection device of the first plurality of data selection devices comprises:
a first data input adapted for receiving functional logic input data from a respective one of a plurality of input cells;
a second data input adapted for receiving a respective portion of the dynamic fault data from the second register; and
a control input adapted for receiving a respective portion of the selection data from the first register.

4. The apparatus of claim 1, wherein each data selection device of the second plurality of data selection devices comprises:
a first data input adapted for receiving a respective portion of functional logic output data from the functional logic;
a second data input adapted for receiving a respective portion of the fault data from the second register; and
a control input adapted for receiving a respective portion of the selection data from the first register.

5. The apparatus of claim 1, wherein the controller applies the selection data to the first register as a selection vector and applies the dynamic fault data to the second register as a plurality of dynamic fault vectors.

6. The apparatus of claim 1, further comprising:
system software in communication with the circuit device, the system software being tested using the dynamic fault for determining whether the system software properly detects the dynamic fault.

7. The apparatus of claim 1, wherein the first and second registers comprise user defined scan registers.

8. A method, comprising:
applying selection data to a first register, the selection data adapted for controlling at least one of:
a first plurality of data selection devices adapted for controlling propagation of data to functional logic of the circuit device; and
a second plurality of data selection devices adapted for controlling propagation of data to output logic of the circuit device; and
applying dynamic fault data to a second register, the dynamic fault data adapted for being provided, in a controlled manner based on the selection data, to at least one of the functional logic of the circuit device and the output logic of the circuit device;
wherein the selection data and dynamic fault data is applied in a manner for providing a dynamic fault on at least one of the functional logic and the output logic.

9. The method of claim 8, wherein:
the first register comprises a plurality of bit storage positions associated with at least one of respective data selection devices of the first plurality of data selection devices and respective data selection devices of the second plurality of data selection devices; and
the second register comprises a plurality of bit storage positions associated with at least one of respective data selection devices of the first plurality of data selection devices and respective data selection devices of the second plurality of data selection devices.

10. The method of claim 8, wherein each data selection device of the first plurality of data selection devices comprises:
a first data input adapted for receiving functional logic input data from a respective one of a plurality of input cells;
a second data input adapted for receiving a respective portion of the dynamic fault data from the second register; and
a control input adapted for receiving a respective portion of the selection data from the first register.

11. The method of claim 8, wherein each data selection device of the second plurality of data selection devices comprises:
a first data input adapted for receiving a respective portion of functional logic output data from the functional logic;
a second data input adapted for receiving a respective portion of the fault data from the second register; and
a control input adapted for receiving a respective portion of the selection data from the first register.

12. The method of claim 8, wherein applying the selection data to the first register comprises scanning a selection vector from a controller into the first register.

13. The method of claim 8, wherein applying the dynamic fault data to the second register comprises scanning a plurality of dynamic fault vectors from a controller into the second register.

14. The method of claim 8, further comprising:
testing system software in communication with the circuit device, wherein the system software is tested to determine whether the system software detects the dynamic faults.

15. The method of claim 8, wherein the first and second registers comprise user defined scan registers.

16. An apparatus for injecting dynamic faults in a circuit device, comprising:
a first register adapted to receive selection data adapted for individually controlling each of a plurality of data selection devices;
a second register adapted to receive dynamic fault data for injection into logic of the circuit device based on control of the data selection devices using the selection data; and
a controller for applying the selection data to the first register and the dynamic fault data to the second register in a manner for providing a dynamic fault in the logic of the circuit device.

17. The apparatus of claim 16, wherein the selected data comprises a selection data vector comprising a plurality of bits associated with the respective data selection devices, wherein, for each of the data selection devices, the associated bit of the data selection vector controls whether the data selection device passes an associated portion of the dynamic fault data into the logic of the circuit device.

18. The apparatus of claim 17, wherein the dynamic fault data comprises a plurality of dynamic fault vectors, wherein the dynamic fault vectors are applied to the second register in a manner for generating at least one timing pulse in the logic of the circuit device.

19. The apparatus of claim 17, wherein the dynamic fault data comprises a plurality of dynamic fault vectors, wherein the dynamic fault vectors are applied to the second register in a manner for generating at least one transient pulse in the logic of the circuit device.

20. The apparatus of claim 16, further comprising:
a software module for determining whether system software of the system properly detects the dynamic fault in the logic of the circuit device.

21. The apparatus of claim 5, wherein the dynamic fault vectors are applied to the second register in a manner for providing at least one timing pulse on at least one of the functional logic and the output logic.

22. The apparatus of claim 5, wherein the dynamic fault vectors are applied to the second register in a manner for providing at least one transient pulse on at least one of the functional logic and the output logic.

23. The method of claim 13, wherein the dynamic fault vectors are applied to the second register in a manner for providing at least one timing pulse on at least one of the functional logic and the output logic.

24. The method of claim 13, wherein the dynamic fault vectors are applied to the second register in a manner for providing at least one transient pulse on at least one of the functional logic and the output logic.

25. An apparatus for injecting dynamic fault data into logic of a circuit device, comprising:
a first circuit adapted to receive selection data adapted for controlling injection of the dynamic fault data into the logic of the circuit device;
a second circuit adapted to receive the dynamic fault data for injection into the logic of the circuit device based on the selection data; and
a controller for applying the selection data to the first circuit and the dynamic fault data to the second circuit in a manner for providing a dynamic fault in the logic of the circuit device.

* * * * *